United States Patent [19]
Arai

[11] Patent Number: 4,888,762
[45] Date of Patent: Dec. 19, 1989

[54] ECHO CANCELLER FOR BIDIRECTIONAL TRANSMISSION ON TWO-WIRE SUBSCRIBER LINES

[75] Inventor: Masanobu Arai, Tokyo, Japan

[73] Assignee: NEC Corporation, Tokyo, Japan

[21] Appl. No.: 156,711

[22] Filed: Feb. 17, 1988

[30] Foreign Application Priority Data

Feb. 17, 1987 [JP] Japan ................................. 62-34800

[51] Int. Cl.$^4$ .............................................. H04B 3/23
[52] U.S. Cl. .................................... 370/32.1; 379/410
[58] Field of Search ...................... 379/406, 410, 411; 370/32, 32.1; 364/724; 358/37, 161, 166

[56] References Cited

U.S. PATENT DOCUMENTS 4,344,176  8/1982  Qureshi ............................... 364/724
4,362,909 12/1982  Snijders et al. ....................... 370/32
4,628,157 12/1986  Chance et al. ....................... 379/410
4,748,498  5/1988  Yamanashi et al. .................. 358/37

OTHER PUBLICATIONS

P. F. Adams, S. A. Cox and P. J. Glenn, "Long Reach Duplex Transmission Systems for ISDN Access", pp. 35–42, British Telecommunications J., vol. 2, No. 2, Apr. 1984.
P. F. Adams, "High Pass Filter Location in 2B1Q Transceivers", American National Standards Inst. Telecommunications Committee, Doc. No. T1D1.3/86–193, Oct. 8, 1986.

Primary Examiner—Jin F. Ng
Assistant Examiner—Randall S. Vaas
Attorney, Agent, or Firm—Helfgott & Karas

[57] ABSTRACT

An echo canceller for bidirectional transmission on two-wire metallic subscriber lines in an integrated service digital network employing a filter positioned in the echo path having the property that a zero point is located so as to cancel the echo path transfer function attributable to the inductance component of the line coupling transformer.

9 Claims, 2 Drawing Sheets

4,888,762

ECHO CANCELLER FOR BIDIRECTIONAL TRANSMISSION ON TWO-WIRE SUBSCRIBER LINES

BACKGROUND OF THE INVENTION

1. Field of the Invention

The present invention relates to an echo canceller for bidirectional transmission on two-wire subscriber lines utilizing metallic subscriber lines in an integrated service digital network (ISDN).

2. Description of the Prior Art

In recent years, a number of field trials for the ISDN, which adopts a bidirectional transmission system with an echo canceller utilizing existing metallic subscriber lines for interfacing with subscribers, have been conducted in many countries.

Such an echo canceller circuit is usually coupled to subscriber lines through transformers to exchange transmission and reception signals. For a so-called echo signal, which is part of the transmission signal reflected into the receiver section of its own circuit, the usual method is to achieve a certain degree of attenuation with a hybrid circuit having a simple balancing circuit, and to completely remove further the echo signal at a suppression level of about 60 decibels (dB) or more with an echo canceller which generates and subtracts an echo replica with an adaptive filter having transmission symbols as its input. At this time, the required number of taps of the transversal filter is determined by the length of the inpulse response of the echo entered into the echo canceller section, so that an echo path equalizing filter to shorten this impulse response length is interposed somewhere between the transmission driver and the echo canceller section. Since the long tailing-off part of an impulse response (echo tail) contains many low frequency components, conventionally such a high-pass filter as will suppress the low frequency components is used as this echo path equalizing filter. Usually a fully D.C.-intercepting type high-pass filter is used to make the direct current (D.C.) loss infintely great. A similar arrangement is described by P. F. Adams et al in a paper entitled "Long reach duplex transmission systems for ISDN access" published in the Br Telecom Technol J. Vol. 2, No. 2, April issue, 1984, pp. 35–42.

However, when the recently proposed 2B1Q line codes represented by a random sequence with a D.C. spectrum are applied to an echo canceller provided with the above-mentioned high-pass type filter, the echo canceller generates an unremoved echo residual corresponding to the result of convolution of an echo impulse response component left afteer the (N+1)th tap on the time axis. For instance, if the tap number N is 30 or so and an inductance value is about 50 mH, the average power of this echo residual will be about −10 dB in the absence of echo path equalizing filter, or about −40 dB where an echo path equalizer filter of a full D.C. intercepting type is used. These values are much less than the usually required suppression level of −60 dB. Meanwhile, though it is conceivable to achieve an adequate level of suppression by increasing the tap number N, the tap number N of the echo path equalizing filter then would have to be 100 or more, which is unrealistic.

An object of the present invention is, therefore, to provide an echo canceller for eliminating a pole having a long time constant and thereby accelerating the attenuation of the echo tail by cancelling the pole of an echo path transfer function attributable to the inductance component of the line coupling transformer.

Another object of the invention is to provide an echo canceller capable of reducing the number of taps of a filter by cancelling the pole of said echo path transfer function.

In order to achieve the foregoing objects, in an echo canceller according to the present invention, there is arranged within the echo path a filter having such a zero point as will cancel the pole of the echo path transfer function attributable to the inductance component of the line coupling transformer.

The present invention will be described below in conjunction with the accompanying drawings, in which.

In the drawings, the same reference numerals denote the same or corresponding structural elements.

DETAILED DESCRIPTION OF THE INVENTION

Figure 1:
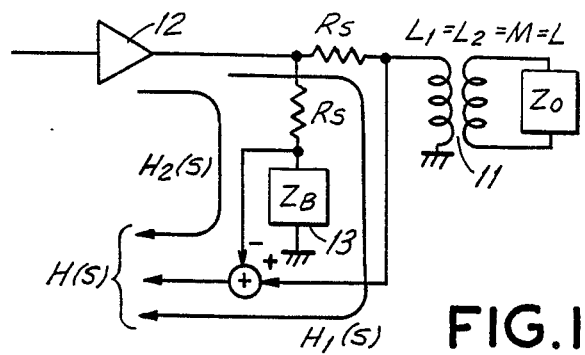
FIG. 1 is a circuit diagram illustrating an example of common hybrid circuit.

Referring to a model structure of a hybrid circuit illustrated in FIG. 1, a transfer function H(S) from a line driver 12 to a reception point of a hybrid section is the sum of a component $H_1(S)$ sent by way of a line coupling transformer 11 side and another component $H_2(S)$ sent via a balancing network ($Z_B$) 13 side. Out of these components, the component $H_2(s)$ is quick in attenuation of impulse response where the balancing network 13 consists of a resistor or a usually conceivable three-element impedance, so that the component $H_1(S)$ predominantly deterines the waveform at or beyond time 10T (T is the baud cycle). The component $H_1(S)$ can be represented by the following equation.

$$H_1(S) = \frac{Z_o}{R_S + Z_o} \cdot \frac{SL}{R_S Z_o/(R_S + Z_o) + SL} \quad (1)$$

where $R_S$ is the transmit impedance on the two-wire side; $Z_o$, the impedance as viewed from the circuit toward the line side; S, jω; and L, the inductance of the transformer. To evaluate equation (1) with respect to the low frequency range, in long line transmission where the amplitude of the echo tail cannot be ignored relative to the receive signal level, $Z_o$ is greater than $R_S$ irrespective of the gauge and length of the line, or the presence or absence of bridged tap, so that equation (1) can be simulated as follows.

$$H_1(S) = \frac{SL}{R_S + SL} \quad (2)$$

Equation (2) represents the primary high-pass characteristic of $\tau = L/R_S$, so that it is seen that the pole of this equation determines the echo tail. The attenuation time constant of the echo tail is equal to $\tau = L/R_S$. For instance, if L=50 mH and $R_S$=135 Ω, $\tau$=about 370 μs and, if T=12.5 μs, $\tau \approx 30T$. This corresponds to the t>30T portion of waveform (A) in FIG. 2 of the impulse response of the echo in the absence of an echo path equalizing filter.

Then, if this echo tail waveform is passed through $a(1-e^{ST})$ filter (not shown), the resultant amplitude will be the difference between two waves of the original echo tail form 1T apart from each other, and will attenuate by $(1-e^{-T/\tau})$ times. If the values of the foregoing example are applied, the attenuation will be by approximately 1/30. This corresponds to the part of $t > 30T$ of waveform (B) shown in FIG. 2. Waveform (B), though smaller in amplitude than waveform (A), has the same time constant as that.

Figure 3:
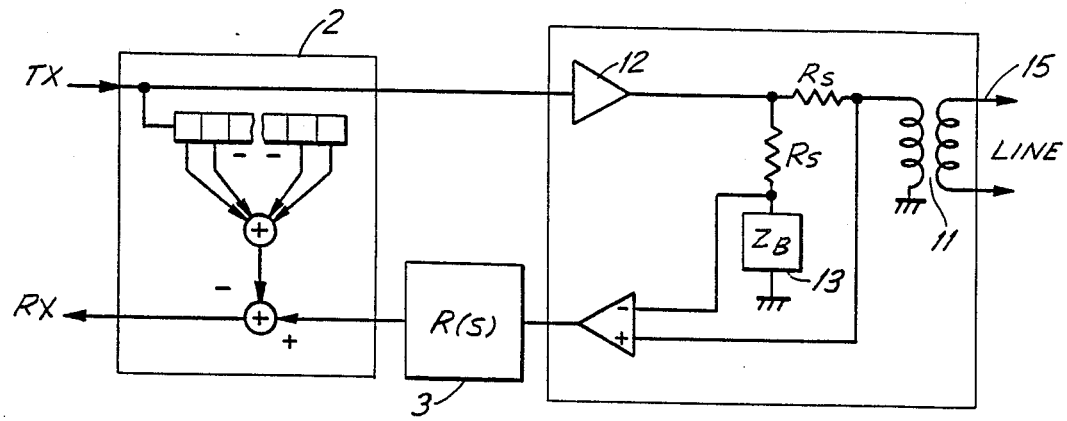
FIG. 3 is a block diagram illustrating the basic structure of the present invention.

Referring now to FIG. 3, a basic structure of the invention includes a hybrid circuit 1, an echo canceller circuit 2 and an echo path filter 3. The hybrid circuit 1, connected to a two-wire subscriber line 15 by way of a line-coupled transformer 11, achieves conversion between two and four wires. Whereas various structures are available for a hybrid circuit, including that of an electronic circuit and that of a transformer, what is to be used herein has to be connected to the subscriber line 15 by the transformer 11.

The echo canceller circuit 2 is connected to the four-wire side of the hybrid circuit 1. For this echo canceller 2 can usually be used either a tranversal filter type or a memory type for bidirectional digital transmission on a two-wire subscriber line.

FIG. 3 shows an outline of the transversal type filter. For details of this filter, reference is made to U.S. Pat. No. 4,087,654, for instance.

The echo path filter 3 is connected between the hybrid circuit 1 and echo canceller circuit 2, has a transfer function R(S) and operates to accelerate the attenuation of the echo tail generated on account of the D.C. interception characteristic of the transformer 11 of the hybrid circuit 1.

Figure 4:
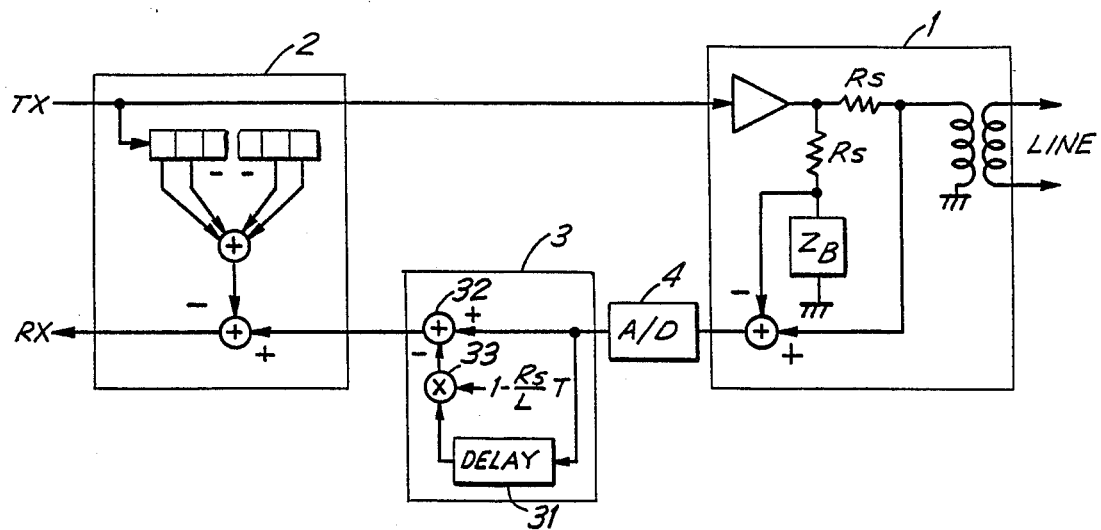
FIG. 4 is a block diagram illustrating a first preferred embodiment of the invention.

FIG. 4 illustrates a first embodiment of the invention. Description of the hybrid circuit 1 and echo canceller circuit 3 is dispensed with here because they are already explained with reference to FIG. 3. In this embodiment, the echo path filter 2 is composed of a digital filter having a delay element 31, an adder 32 and a multiplier 33, and has a transfer function of $R(S) = 1 - (1 - R_S/LT)e^{-ST}$. This echo path filter 3 and the hybrid circuit 1 are connected to each other through an A/D (analog to digital) converter 4.

The echo path filter 3 receives the output of the A/D converter 4. The output of the converter 4 is inputted to the delay circuit 31 and adder 32. The multiplier 33 multiplies an output from the delay element 31 and $1 - R_S/LT$ to produce a transfer function $(1 - R_S/LT)e^{-ST}$. The adder 32 adds the output of the multiplier 33 and that of the A/C converter 4, and outputs the transfer function $R_{(s)} = 1 - (1 - R_S/LT)e^{-ST}$ to the echo canceller circuit 2.

Incidentally, the echo path filter 3 may be composed of a memory and a microprocessor instead of the delay element 31, adder 32 and multiplier 33, and be controlled with a microprogram. In this case, the microprocessor may also be used for arithmetic operation of the echo canceller circuit 2.

The transfer function R(S) of the echo path filter 3 is in the form of $$R(S) = 1 - (1 - R_S/LT)e^{-} \tag{3}$$

which can be approximated as follows if $e^{-ST}$ is developed in the low frequency range:

$$R(S) \approx R_S/L + ST \tag{4}$$

provided that $L >> R_S T$

Figure 2:
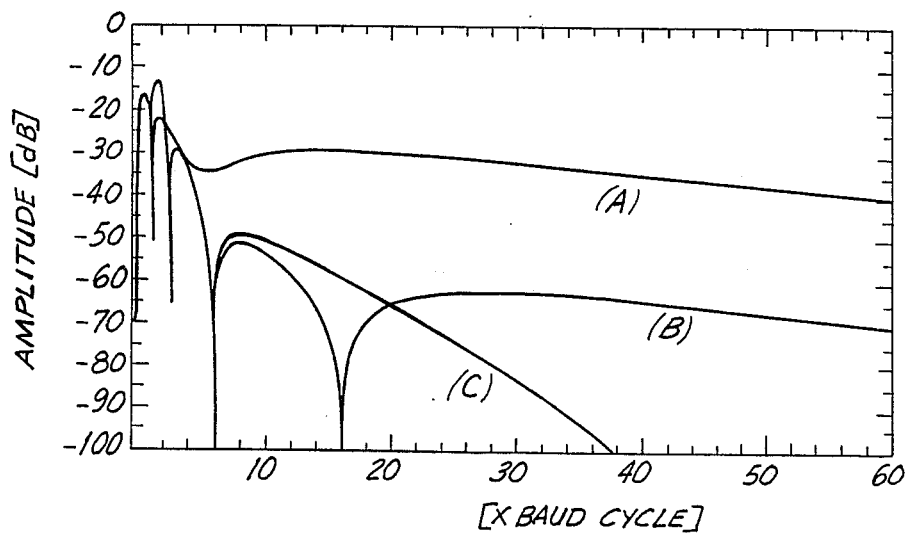
FIG. 2 is a diagram illustrating echo tail waveforms.

From approximate equation (4), it is known that R(S) has the zero point at $S = -R_S/L$, and its frequency is the same as the pole of equation (2) above. Waveform (C) of FIG. 2 is the outcome of waveform (A) having passed this echo path filter 3. The transfer function R(S) has the advantage of eliminating waveforms having long time constants because of the cancellation of the pole of equation (2) at the zero point. As a result, waveform (C) attenuates quickly, becoming smaller in amplitude than waveform (B) at and after time 20T.

With respect to waveform (C), the number of taps of the echo canceller circit being supposed to be N, calculation of the echo residual resulting from the convolution of the impulse response component after $(N+1)T$ with the transmission symbol sequence reveals that a suppression level of 60 dB or more can be achieved even at $N = 30$, so that an echo canceller with a sufficient suppression level can be realized with a smaller number of taps than with waveform (A) or (B).

Incidentally, as the inductance of the transformer is usually so selected as to make $L/R_S$ greater than T, $1 - R_S/LT$ is a constant close to but smaller than 1. The pole attributable to the transformer inductance, as in equation (2) above, is $S = -R_S/L$ in a long line condition, and where the transmission distance is different, some constant other than $K = 1 - R_S/LT$ may be the optimum.

Figure 5:
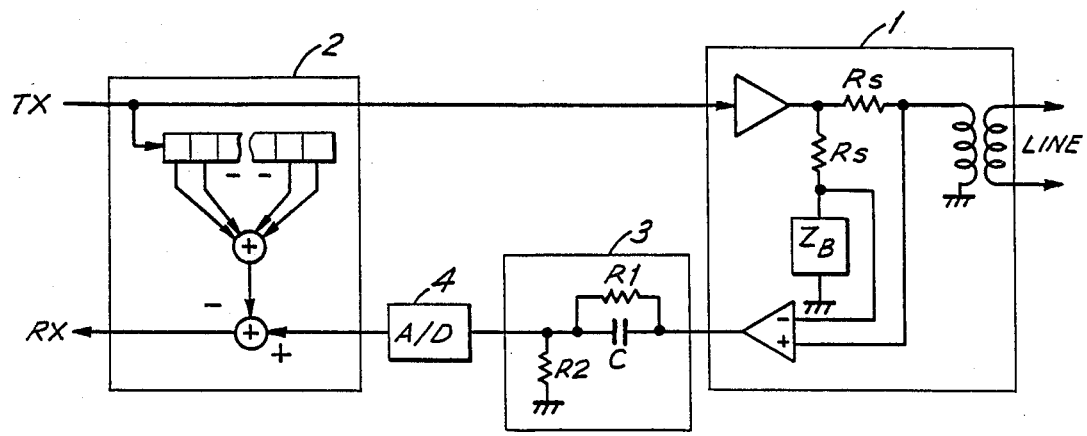
FIG. 5 is a block diagram illustrating a second preferred embodiment of the invention.

Referring to FIG. 5, a second embodiment of the invention includes the echo path filter 3 realized with an analog filter comprising resistors R1 and R2 and a capacitor C. In this case, the transfer coefficient R(S) is altered by the resistor R1 and R2 and the capacitor C as represented by equation (5).

$$R(S) = \frac{S + \frac{1}{CR_1}}{S + \frac{R_1 + R_2}{CR_1 R_2}} = \frac{S + \omega_0}{S + \omega_1} \tag{5}$$

When the pole of equation (2) and the zero point of equation (5) coincide with each other, i.e., when $$R_S/L = 1/CR_1 = \omega_0 \tag{6}$$

the overall characteristic of the echo path will have no component of a long time constant, and the impulse response of echoes will manifest a quickly attenuating characteristic, substantially similar to that of FIG. 2(C). Like in the example of FIG. 4, $\omega_0 = R_S/L$ will prove the optimum under a long line condition.

What is claimed is:
1. An echo canceller comprising:
   a transformer for connecting to a two-wire subscriber line;
   a hybrid circuit having a four-wire side and coupling its four-wire side to said two-wire subscriber line via said transformer;
   an echo canceller circuit connected to said hybrid circuit for cancelling an echo signal; and
   an echo path filter connected between said hybrid circuit and said echo canceller circuit and having a zero point for cancelling a pole of an echo path transfer function attributable to an inductance component of said transformer.

2. An echo canceller, as claimed in claim 1, wherein said echo path filter is a digital filter having a transfer function R(S) and wherein $R(S) = 1 - Ke^{-ST}$ where K is a constant close to and smaller than 1 and T is an operating cycle of the digital filter.

3. An echo canceller, as claimed in claim 2, so structured as to make said constant K equal to $1 - R_S/LT$ where $R_S$ is the transmit impedance on the two-wire side of said hybrid circuit and L is the inductance of the transformer.

4. An echo canceller, as claimed in claim 1, so structured as to make the transfer function R(S) of said filter equal to $(S+\omega_0)/(S+\omega)$ where $\omega_0$ is a characteristic of the echo path.

5. An echo canceller, as claimed in claim 4, so structured as to make said $\omega_o$ equal to $R_S$ where $R_S$ is the transmit impedance on the two-wire side of said hybrid circuit and L is the inductance of the transformer.

6. In transformer-coupled two-wire subscriber telephone equipment wherein at an input of a coupling transformer, a hybrid balancing circuit is provided and an echo canceller circuit for cancelling a portion of a transmission signal known as the echo is connected between an output of said hybrid balancing circuit and a signal transmission line from a transmitter, the equipment further comprising a long time constant waveform signal filter connected between the output of said hybrid balancing circuit and said echo canceller circuit, said filter being operable in performance to eliminate waveforms having a long time constant and thereby to rapidly attenuate the effect of the coupling transformer on a signal from said transmitter, said long time constant waveform filter being connected to the output of an analog to digital converter connected to the output of said hybrid balancing circuit, wherein, in said filter, an output of said analog to digital converter is connected to an addition circuit which in turn is connected to said echo canceller filter, and the output of said analog to digital converter is further connected through a delay line and a multiplier, in series, with the output thereof being combined with the output signal of said analog to digital converter in said addition circuit.

7. The improvement of claim 6 wherein said long time constant waveform filter has a transfer function $R_{(s)}$ and wherein $R_{(s)} = 1 - (1 - R_s T/L)e^{-ST}$, where $R_s$ is the transmit impedance on the two-wire side of said hybrid balancing circuit, T is an operating cycle of said filter and L is the inductance of said transformer.

8. In a transformer-coupled two-wire subscriber telephone equipment wherein at an input of a coupling transformer, a hybrid balancing circuit is provided and an echo canceller circuit for cancelling a portion of a transmission signal known as the echo is connected between an output of said hybrid balancing circuit and a signal transmission line from a transmitter, the equipment further comprising a long time constant waveform signal filter connected between the output of said hybrid balancing circuit and said echo canceller circuit, said filter being operable in performance to eliminate waveforms having a long time constant and thereby to rapidly attenuate the effect of the coupling transformer on a signal from said transmitter, said long time constant waveform signal filter being a resistance and capacitance parallel combination, having one terminal of said combination connected to the output of said hybrid balancing circuit and having the other terminal of said combination connected through a resistor to ground and through an analog to digital converter to said echo canceller filter.

9. The improvement of claim 8 wherein the characteristic of said echo portion of said transmission signal is $w_o = Rs/L$, where $W_o$ is the characteristic of an echo path, Rs is the transmit impedance on the two-wire side of said hybrid balancing circuit and L is the inductance of the transformer.

* * * * *